United States Patent [19]

Katagiri et al.

[11] 4,287,811

[45] Sep. 8, 1981

[54] BRAKE BOOSTER

[75] Inventors: Masayoshi Katagiri, Toyota; Osamu Ogura, Nagoya, both of Japan

[73] Assignees: Toyota Jidosha Kogyo Kabushiki Kaisha; Aisin Seiki Kabushiki Kaisha, both of Aichi, Japan

[21] Appl. No.: 71,489

[22] Filed: Aug. 31, 1979

[30] Foreign Application Priority Data

Feb. 28, 1979 [JP] Japan .................................. 54-22633

[51] Int. Cl.³ .............................................. F15B 9/10
[52] U.S. Cl. ................................. 91/369 A; 91/369 B; 91/374
[58] Field of Search ............. 91/369 A, 369 B, 369 R, 91/391 R, 391 A, 374; 60/547 R, 554, 552

[56] References Cited

U.S. PATENT DOCUMENTS

| | | | |
|---|---|---|---|
| 3,143,930 | 8/1964 | Ayers, Jr. ......................... | 91/391 A |
| 3,183,789 | 5/1965 | Stelzer .............................. | 91/369 B |
| 3,452,646 | 7/1969 | Abbott et al. .................... | 91/369 A |
| 3,845,692 | 11/1974 | Takeuchi ........................... | 91/369 B |

*Primary Examiner*—Paul E. Maslousky

*Attorney, Agent, or Firm*—Stevens, Davis, Miller & Mosher

[57] ABSTRACT

A brake booster of the stroke enlarging type wherein a power piston operated by the pressure difference existing on opposite sides thereof is moveable relative to a control piston provided with a control valve for controlling the difference of the pressure, and the power piston and the control piston are engageable to be immovable relative to each other by means of a locking member after the pressure difference has reached a predetermined value. The power piston is so constructed as to be able to advance a larger distance than the control piston, while the pressure difference is small, to move the output member by a larger amount in comparison to a small amount of advancement of the input member of the booster. The locking member is normally retained at the retracted position by means of a spring and is advanced, against the action of the spring, when the pressure difference on opposite sides of the power piston has reached the predetermined value, to engage the power piston with the control piston so they move together and prevent the output member from remaining stationary upon advancement of the input member caused by to a retraction of the power piston relative to the control piston.

9 Claims, 6 Drawing Figures

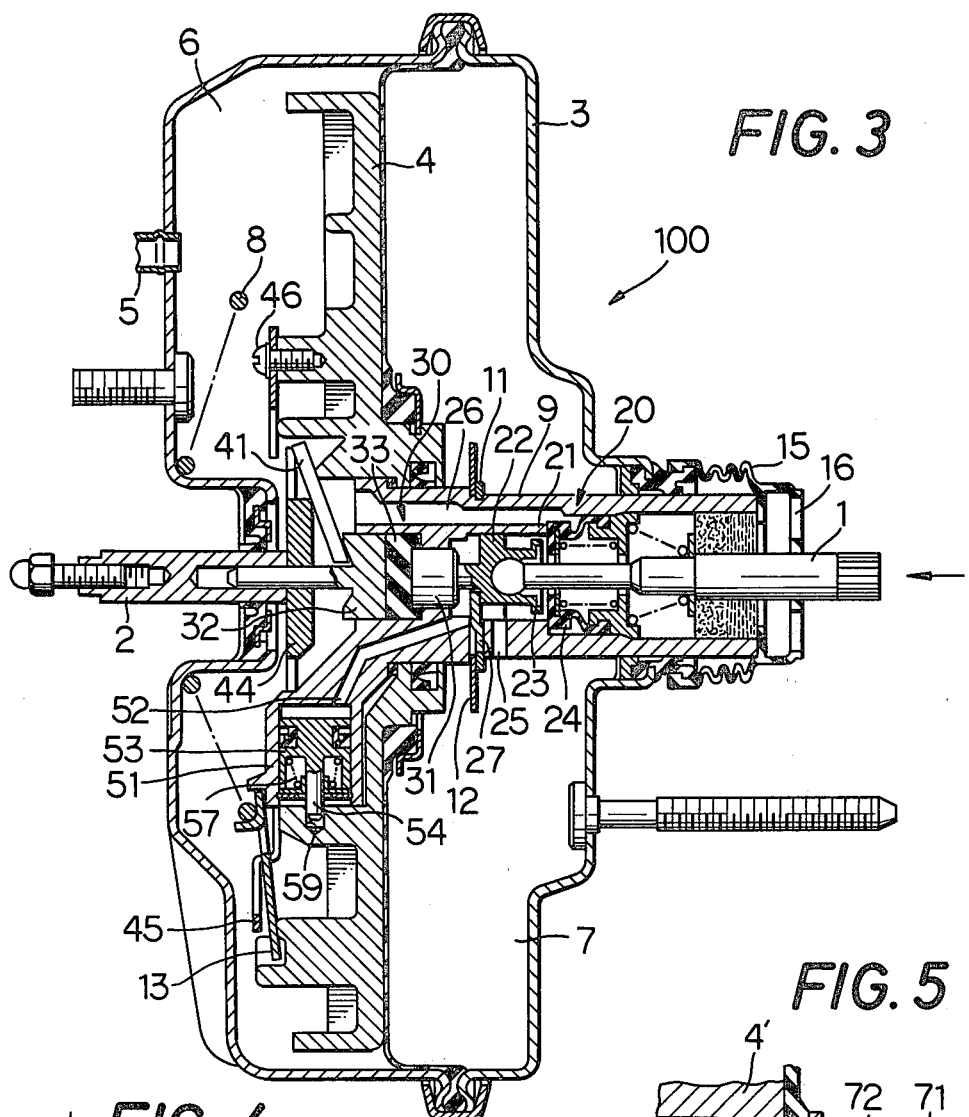
FIG. 3
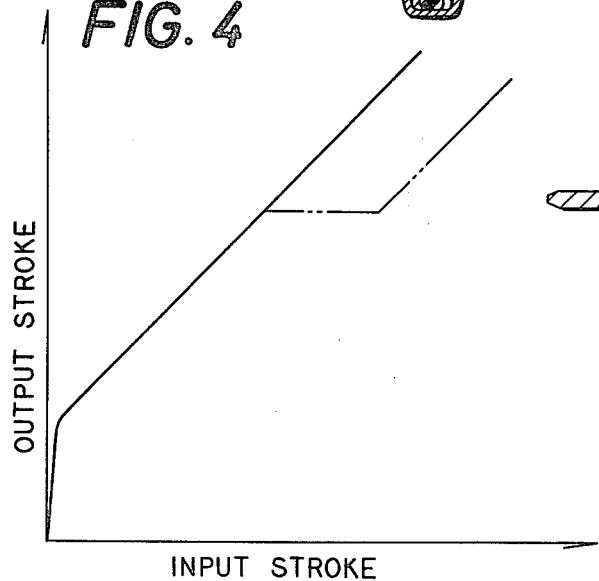
FIG. 5
FIG. 4
OUTPUT STROKE
INPUT STROKE

FIG. 6
(i) 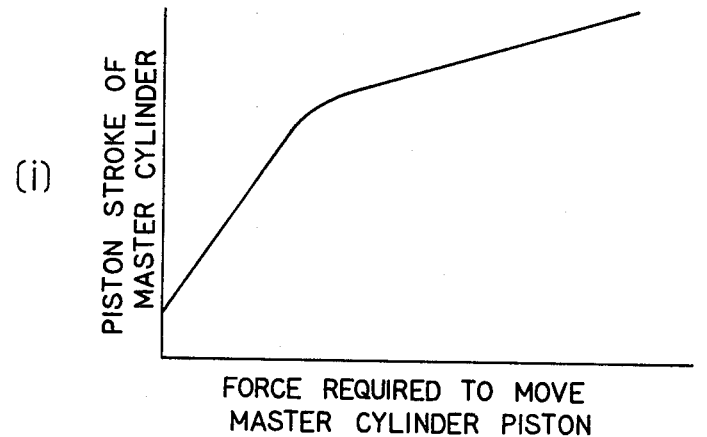
(ii) 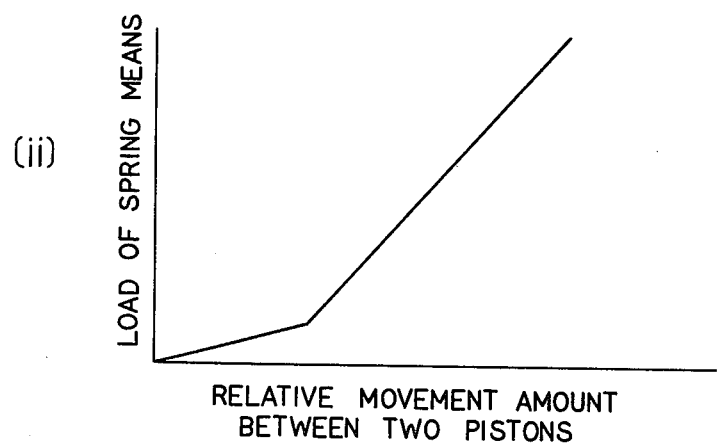
(iii) 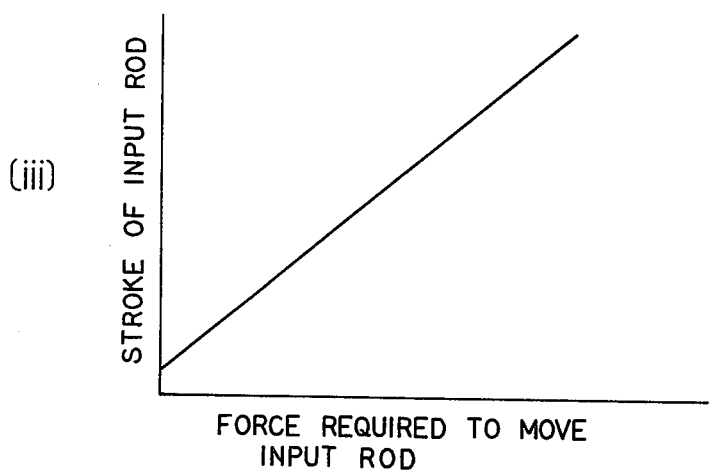

BRAKE BOOSTER

BACKGROUND OF THE INVENTION

This invention relates to a brake booster for boosting a brake operational force by means of utilizing gas pressure, more particularly, to an improvement in a stroke enlarging type booster.

A stroke enlarging type booster herein referred to is a brake booster wherein a power piston is disposed in a manner of bisecting a booster casing so as to be operated by a pressure difference between the pair of divided chambers. The power piston is separated from a controlling mechanism which controls the pressure difference due to an operation of an input member, so as to be shiftable in relation to the controlling mechanism. This stroke enlarging type brake booster is capable of obtaining a larger output stroke than the stroke input, unlike ordinary brake boosters wherein the output stroke is always the same as or smaller than the input stroke. This type of stroke enlarging brake booster is described in pending U.S. patent application Nos. 919,071, now U.S. Pat. No. 4,242,943, and 46,046. In the former a spring means for transmitting a part of operational force of the power piston to the controlling mechanism is used, while in the latter it is not. Both boosters are almost identical otherwise.

Ensuing studies in this field revealed that there was still room for improvement. Although there is little problem in a stroke enlarging type brake booster with a power piston which is actuated by a large difference of pressure acting on opposite sides thereof, in a case wherein boosting force, that is, the above-mentioned difference of pressure has a certain highest limit a problem arises that an attempt of obtaining an output force over a critical point, which corresponds to the highest limit of the pressure difference, invites a temporary rapid increase of pedal stroke alone without bringing about a corresponding expected increase of braking force, which is a seriously disadvantageous phenomenon.

SUMMARY OF THE INVENTION

A primary object of this invention to provide a stroke enlarging type brake booster wherein an output force larger than the output force at the critical point can be obtained without inviting an unnatural increasing of the pedal stroke and also no disadvantage arises even in the operation thereof in the range beyond the critical point.

It is another object of this invention to provide a stroke enlarging type brake booster which attains the above-mentioned object with a structure as simple as possible and at a manufacturing cost as low as possible.

The brake booster in accordance with this invention is constructed with a control piston, as a main body of the controlling mechanism, a power piston disposed relatively movably thereto, a locking member retained by either of the control piston or the power piston and operated between a first position and the second position due to the pressure difference in the chambers on opposite sides of the power piston, and blocking at its first position the relative movement of the two pistons by being engaged with an engaging portion disposed on the opposite one of the two pistons from that on which it is retained, and resilient means, which normally retains the locking member at its second position and allows the locking member, when the pressure difference in the chambers on opposite sides of the power piston has exceeded the predetermined value, to move to its first position for engaging with the engaging portion.

The brake booster of this invention can also be constructed from the following components:

(1) an input member for inputting the brake operational force;

(2) an output member for outputting the boosted force;

(3) a power piston disposed in a manner of dividing the inside room of a casing into two, a constant pressure chamber and a variable pressure chamber, normally urged by resilient means toward the retracted position, and advanced in the axial direction, resisting the action of the resilient means, in accordance with the pressure difference in the two chambers;

(4) a control piston disposed relatively movably in the axial direction to the power piston within a pre-limited distance, normally retained at the retracted position by resilient means, and forwardly movable together with the power piston when the pre-limited distance relatively movable thereto has been reduced to zero;

(5) a control valve operable in response to relative movement between the control piston and the input member to control the pressure difference in the two chambers on opposite sides of the power piston;

(6) a transmitting mechanism for transmitting forces applied by the control piston and the input member, while allowing relative movement within the limited distance between the control piston and the input member;

(7) a reaction lever, abutting at one end thereof to the output portion of the transmitting mechanism, abutting at the other end thereof to the output portion of the power piston, and abutting at the middle portion thereof to the input portion of the output member, for transmitting the output force from the transmitting mechanism and the power piston to the output member, while allowing relative movement between the transmitting mechanism and the power piston;

(8) a locking member, retained by the control piston movably in a radial direction thereof, for blocking relative movement between both pistons, when being in the advanced position, by engagement with the engaging portion formed on the power piston;

(9) operating force imparting means for imparting an operating force to the locking member for advancing it to an advanced position, owing to the difference of pressure in the two chambers on opposite sides of the power piston; and

(10) resilient means, normally holding the locking member at the retracted position, and allowing the locking member to advance to the forward position when the operational force toward the advanced position by the operating force imparting means has exceeded a pre-limited value.

In the brake booster of this invention, disposition of the locking member on the power piston and the engaging portion on the control piston is also permissible.

This invention succeeds in eliminating the disadvantage in the previously invented stroke enlarging type brake booster of a temporary rapid increasing of the pedal stroke in the range beyond the limit of the boosting force. It has largely enhanced the practicability of the brake booster of the stroke enlarging type, having made possible the manufacturing of an ideal brake mechanism which is operated by a fairly small stroke for producing a large braking effect.

BRIEF DESCRIPTION OF THE DRAWINGS

FIG. 3 is an axial sectional view of the booster in FIG. 1 in a different operational condition;

FIG. 4 is a graph for illustrating the relation between the input stroke and the output stroke of the booster shown in FIG. 1;

FIG. 5 is an enlarged axial sectional view of an essential part of another embodiment of a brake booster; and FIG. 6 (i), (ii), and (iii) are graphs for explaining the operation of the brake booster of FIG. 5.

DETAILED DESCRIPTION OF THE PREFERRED EMBODIMENTS

With reference to the appended drawings preferred embodiments of this invention will be described in detail. The objects, structure and effects will further be understood clearly from this description.

Figure 1:
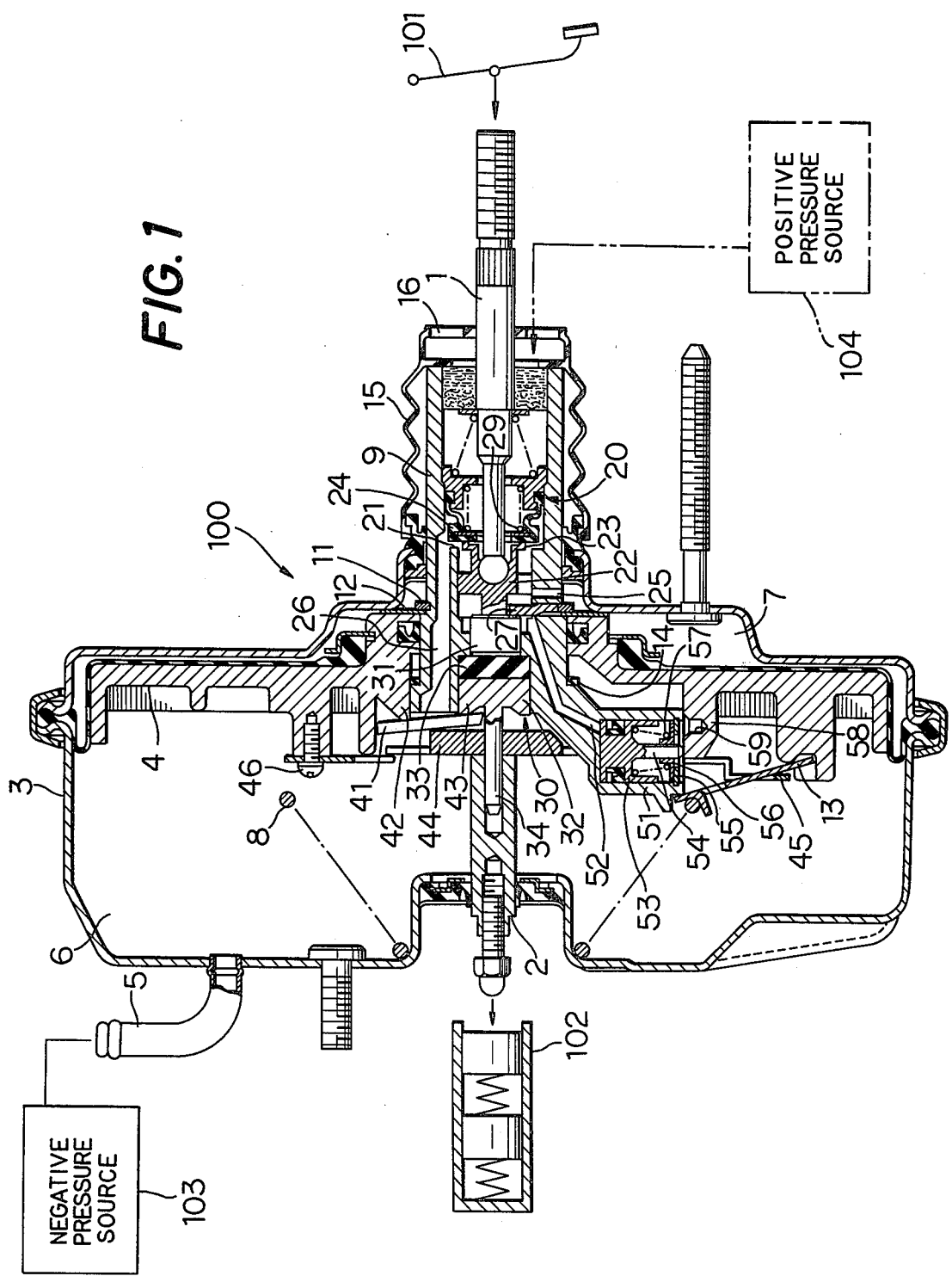
FIG. 1 is an axial sectional view of an embodiment of a booster in accordance with this invention.

In a booster generally designated with 100 in FIG. 1, a force applied from a brake pedal 101 to an operating rod 1, an input member, is boosted to be output from a push rod 2, an output member, to a master cylinder 102.

The booster 100 is provided with a gas-tight casing 3, the inner chamber of which is divided into two parts by a diaphragm type power piston 4. One of the chambers is made into a constant pressure chamber 6 by being connected to a vacuum source or a negative pressure source such as an intake manifold of the engine, a vacuum pump, etc., via a pipe joint 5. The other chamber is made into a variable pressure chamber 7, by means of being communicated selectively to the constant pressure chamber 6 or to the ambient atmosphere, by a later described control valve.

Figure 2:
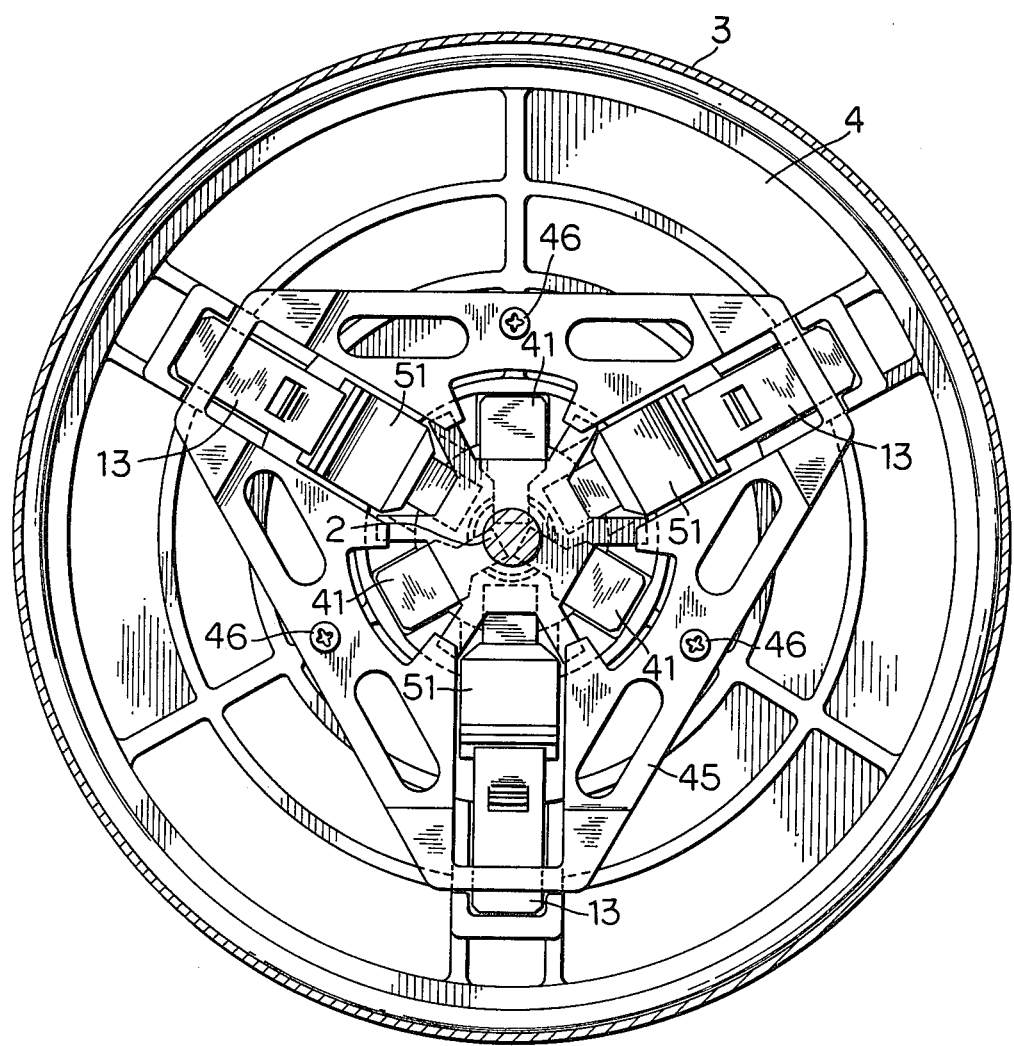
FIG. 2 is a cross section of FIG. 1 taken along the section line II—II.

In a through bore formed in the central part of the power piston 4 is slidably fitted a control piston 9, which is a main body of the controlling mechanism. The control piston 9 has its backward movement limit position (retracted position) fixed by its abutting a stopper plate 12 on the inner surface of the casing 3, which is fixed with an E-shape ring 11 on the outer periphery of the control piston. The power piston 4 also has its backward movement limit position fixed by it abutting, via the stopper plate 12, on the inner surface of the casing 3, and normally is retained at the backward movement limit position (retracted position) by the action of return spring 8, via a spring holder 13 which spans both pistons 4, 9. There are three spring holders 13, as shown in FIG. 2, disposed radially with an equal angular distance from each other. The power piston 4 is allowed to advance in relation to the control piston 9, the advance amount being regulated by the abutment of the power piston 4 on a cushion ring 14 fitted on the control piston 9.

The controlling mechanism is composed of a control valve 20 and a transmitting mechanism 30.

The control valve 20 is made up of a first valve seat 21 formed on the control piston 9, a second valve seat 23 formed on a valve plunger 22 which is slidably fitted in the control piston 9, and a valve element 24 of resilient material commonly disposed to the valve seats 21, 23. The valve element 24 is urged toward the valve seats 21, 23 by a compression spring 29, being normally abutted on the second valve seat 23 and separated from the first valve seat 21, while the brake operational force is not applied to the operating rod 1 which is fixed to the valve plunger 22 at the tip thereof. Accordingly the variable pressure chamber 7 is isolated from the ambient atmosphere and is communicated, via passageways 25, 26, with the constant pressure chamber 6, being at the same negative pressure as the constant pressure chamber 6. When the operating rod 1 is advanced forward the first valve seat 21 abuts on the valve element 24 and the second valve seat 23 is separated from the valve element 24, separating the variable pressure chamber 7 from the constant pressure chamber 6 and communicating it with the ambient atmosphere. The pressure of the variable pressure chamber 7 will be raised because of the in flow of air sucked from an air sucking opening 16 in a boot 15 into the variable pressure chamber 7. The forward movement limit of the valve plunger 22 is regulated by a stopper 27 secured on the control piston 9.

The transmitting mechanism 30 is composed of a small plunger 31, a part of the valve plunger 22, slidably fitted in a small diametered bore portion of the control piston 9, a large plunger 32, slidably fitted in a large diametered bore portion of the control piston 9, and a reaction disc 33 sandwiched between the both plungers 31, 32. The small plunger 31 of the valve plunger 22 transmits a brake operational force from the operating rod 1 to the reaction disc 33, the latter working similarly as a fluid filled in a space encompassed by the both plungers 31, 32 and the control piston 9. The reaction disc 33 transmits a resultant force from the operating rod 1 and the control piston 9 to the large plunger 32, while allowing a minute relative movement between the small plunger 31 and the control piston 9, in other words, the relative movement between the operating rod 1 and the control piston 9. The large plunger 32 is provided with a rod portion 34 forwardly protruding in the central portion thereof, which rod portion 34 slidably retains the rear end of the push rod 2.

The output force from the large plunger 32 and the power piston 4 is transmitted by a reaction lever 41 to the push rod 2. The reaction lever 41 abuts, at one end thereof, on an output portion 42 of the power piston 4, at the other end thereof, on an output portion 43 of the large plunger 32, and, at the middle portion thereof, on a plate 44, which is an input portion of the push rod 2. The reaction lever 41 thus transmits a resultant force from the power piston 4 and the large plunger 32, while allowing relative movement between both, to the push rod 2. There are three reaction levers 41 disposed radially, as clearly shown in FIG. 2, with an equal angular distance of 120°. Numeral 45 designates a retainer plate, secured to the power piston 4 with a screw 46, for retaining the spring holder 13 at a predetermined position, and for preventing the plate 44, an input portion of the push rod 2, from separating away from the power piston 4 beyond a predetermined limit.

On the front end of the control piston 9, three cylinder portions 51 are, as shown in FIG. 2, radially disposed as a protrusion with an equal angular distance of 120°. A cylinder bore which is communicated with the variable pressure chamber 7 via a passageway 52 as shown in FIG. 1 is formed in each cylinder portion 51. A lock piston 53 is respectively fitted in the cylinder bore, in a movable manner in the perpendicular direction to the movement direction of control piston 9, that is in the radial direction of the control piston 9. The lock piston 53 is provided, in the central portion thereof, with an engaging projection 54, which projects through the central part of a spring retainer 56 secured to the cylinder portion 51 via an E-shape ring 55'. A compression spring 57 is mounted between the spring retainer 56 and the lock piston 53 for normally biasing the latter toward the retracted position.

In a rib 58 of the power piston 4 is, formed an engaging hole 59 at a position where it confronts the engaging projection 54 of the lock piston 53 when the power piston 4 is advanced forwardly in relation to the control piston 9 to the point where it abuts on the cushion ring 14 fitted on the control piston 9.

The operation of the booster 100 will be described next.

In a non-depression state of the brake pedal 101 the second valve seat 23 is in contact with the valve element 24, with the first valve seat 21 being away therefrom. The variable pressure chamber 7 is therefore in communication with the constant pressure chamber 6 and contains a negative pressure, producing no pressure difference on opposite sides of the power piston 4. The power piston 4 and the control piston 9 are both retained at the retracted position respectively due to the action of the return spring 8.

In this condition, a slight depressing of the brake pedal will cause the operating rod 1 to be moved forwardly, resulting in a contact of the first valve seat 21 with the valve element 24 and a separation of the second valve seat 23 therefrom. This isolates the variable pressure chamber 7 from the constant pressure chamber 6 and communicates it with the ambient atmosphere. A resulting pressure difference, caused by the flowing-in of the air into the variable pressure chamber 7, on opposite sides of the power piston 4 will push forwards the power piston 4. The reaction lever 41 will be, in turn, rotated about a fulcrum resting on the output portion 43 of the large plunger 32 and the push rod 2 will be moved forwardly, by way of the plate 44 which abuts on the middle portion of the reaction lever 41. Accompanied by this movement the braking fluid in the master cylinder 102 is supplied to a not-illustrated hydraulic system for nullifying the brake clearance and filling up the necessary amount of consumption fluid caused by the initial stage deformation of the piston cup, etc. Assume that this piston stroke of the master cylinder 102 in this process is called an initial stroke, then one of the main features of the booster 100 of this invention lies in that the initial stroke in question can be obtained by a small amount of input stroke (stroke of the operating rod 1).

At the initial stage of the braking effect, upon disappearance of the brake clearance, the power piston 4 comes to an abutment on the cushion ring 14 fitted on the control piston 9, and it will, once abutted thereon, begin to move together with the control piston 9. In this process the operating mode of the booster 100 is entirely identical to that of ordinary boosters. In short, the operating rod 1 and the power piston 4 push forward the push rod 2, while sharing the force at a ratio determined by the reaction lever 41 and the reaction disc 33. At this stage the output stroke increases at the same rate as the input stroke as shown in FIG. 4.

At a suitable timing of this process, the lock piston 53 advances, resisting the biasing force of the compression spring 57, and its engaging projection 54 fits into the engaging hole 59 in the power piston 4. The lock piston 53, which is affected at the front side thereof by the pressure in the constant pressure chamber 6 and at the rear side by the pressure in the vicinity of the valve plunger of the variable pressure chamber 7, will be moved to the advanced position, owing to a domination of the lock-piston-actuating force over the biasing force of the compression spring 57, when the pressure in the passage 52 and in the variable pressure chamber 7 is raised in response to the progressive operation of the operating rod 1 and the difference between that pressure and the pressure in the constant pressure chamber 6 has reached a predetermined value. This makes possible the fitting of the engaging projection 54 of the lock piston 53 into the engaging hole 59 of the power piston 4.

Although the above-mentioned process alone suffices in ordinary braking operation, a further strong depression of the brake pedal 101 which occurs in an emergency braking produces a further advancing of the operating rod 1. As a consequence this strong force is applied, via the output portion 43 of the large plunger 32, on one end of the reaction lever 41, which will in turn be rotated clockwise in FIG. 3 on the fulcrum resting on the plate 44, the input portion of the push rod 2 then tending to push back (rightwardly in FIG. 3) the power piston 4. A force which must resist this pushing back force is the force created by the pressure difference on opposite sides of the power piston 4. This pressure difference is limited or finite, so the piston-forwarding force will eventually be overcome by the piston-pushing back force. If there is no lock piston 53 installed in this situation, the power piston 4 begins to move back (retract) actually, resulting in a stoppage of the plate 44 and the push rod 2 regardless of the forward movement of the large plunger 32. It means an absorption of the movement of the large plunger 32 by the retraction of the power piston 4, which will be continued until the output portion 43 abuts on the plate 44 having the reaction lever 41 sandwiched therebetween. It results in an appearance of an idle stroke wherein no increase of stroke is seen in the push rod 2 irrespective of stroke increase in the operating rod 1, as shown in FIG. 4 with a two-dot-chain line, so that the braking hydraulic pressure in the master cylinder 102 does not rise. This phenomenon is an inevitable fault of the booster in accordance with the inventions applied patent as U.S. patent application Nos. 919,071 and 46,046. The present invention has solved this problem in the booster 100 by means of mounting of the lock piston 53. In the booster 100, the engaging projection 54 formed on the lock piston 53 is fitted, at the above-mentioned stage, into the engaging hole 59, as shown in FIG. 3, to block the relative movement of the power piston 4 to the control piston 9, preventing the retraction of the power piston 4. As the relative movement limit of the valve plunger 22 to the control piston 9 is regulated by the stopper 27, all of the operating rod 1, the valve plunger 22, the control piston 9, the large plunger 32, the power piston 4, and the reaction lever 41 are consolidated in one body. The push rod 2 is thus pushed forward, via the plate 44, by this consolidated one body, so the output stroke is increased even at this stage at the same rate as the input stroke increases. As the boosting capacity of the power piston 4 reaches, at this stage, its highest limit, the output force of the booster 100 increases by the same amount as the increase of the brake operating force.

When the depression of brake pedal 101 is released, the operational process is the reverse of that just described as to release the brake, back to the condition shown in FIG. 1. The lock piston 53 can in this occasion be released from engagement with the power piston 4 almost at the same timing as the retraction of the operating rod 1, because it is under the influence of the pressure in the vicinity of the valve plunger 22 through the passageway 52. The booster 100 has an excellent response in this sense.

The above described embodiment is but exemplary of the present invention, which should not be interpreted as being limited to the above embodiment. Many modifications and variations which may be thought of by those skilled in the art are included within the spirit and scope of the present invention.

It is possible, for example, to dispose the lock piston 53 in the power piston 4, forming on the other hand the engaging hole in the control piston 9.

In the aforementioned embodiment, the lock piston 53 is utilized as a locking member, and the passage 52 disposed at the back side of the lock piston 53 for leading the pressure in the variable pressure chamber 7 is utilized as a means for operating the locking member. The locking member is not necessarily limited to a form of piston which is directly operated by the pressure difference between the constant pressure chamber and the variable pressure chamber, but may be a member indirectly actuated by a piston, etc., which is operated by the pressure difference between the two chambers. The engaging portion for engaging with the locking member is not limited to the engaging hole as in the aforementioned embodiment, a mere rib formed on the power piston or the control piston or a C-shape ring fitted in an annular groove of those pistons can also be used.

It is also possible to modify, as shown in FIG. 5, the booster corresponding to the invention of U.S. patent application No. 919,071 wherein spring means (composed of two coil springs of different length 71, 72) is interposed between the power piston 4' and the control piston 9' for transmitting a part of the operational force from the power piston 4' to the control piston 9', by mounting a lock piston 73 on the power piston 4' and forming an engaging hole 74 in the control piston 9'. The effect of this invention is also attainable in this case.

In the ordinary braking system the piston stroke of the master cylinder and the force required to move the piston are generally not in the linear relation but in a relation described in a curve, as can be seen in FIG. 6(*i*). A similar tendency appears between the brake operational stroke and the operational force, not being in a proportional relation, in the event of employing conventional boosters; however, in case of the booster shown in FIG. 5, the stroke of the input rod and the force necessary for moving the input rod shows a proportional relation as in FIG. 6 (*iii*), because the spring means has a load characteristic which can be described as a bent (or indented) line shown in FIG. 6 (*ii*). Consequently the brake operational stroke and the operational force become proportional to each other, contributing to the improvement of the brake feeling. In this case, a similar phenomenon to the previous embodiment occurs, too, that the output stroke does not increase irrespective of the increase of the input stroke, because the power piston retracts in relation to the control piston after the boosting force due to the pressure difference reaching its highest limit.

In this embodiment the above-mentioned disadvantages due to the relative retraction of the power piston 4' to the control piston 9', after the pressure difference reaches the limit, can be eliminated by the engagement of the lock piston 73 fitted in the cylinder portion 75 formed in the power piston 4' with the engaging hole 74 in the control piston 9'. In respect of other points this embodiment is almost identical to the previous one, permitting of omission of the superfluous explanation and drawings.

It is also possible to apply this invention to a positive pressure type booster wherein the constant pressure chamber 6 is communicated to the ambient atmosphere and the variable pressure chamber 7 is connected, via a control valve 20, to a positive pressure source 104 (illustrated with two-dot-chain lines in FIG. 2). Other modifications and variations are of course also permissible without departing from the spirit of this invention.

What is claimed is:

1. A brake booster of the stroke enlarging type comprising:

a power piston disposed in a casing to divide an area within the casing into two chambers, said power piston moving in accordance with the difference of pressures in said chambers on opposite sides of said power piston and being movable for a predetermined distance relative to a control piston, a control valve for controlling the pressure difference in said chambers in accordance with the operation of an input member, to enable an output member to obtain a larger stroke than the stroke of the input member at least during the initial stage of the braking operation, a locking member movably retained by one of said power piston and said control piston and an engagable member provided on the other of said power piston and control piston, said locking member being movable by said pressure difference in said chambers between a first position out of engagement with said engagable member allowing said control and power pistons to be movable relative to one another and a second position into engagement with said engagable member to lock said control and power pistons together for joint movement; and resilient means for normally retaining said locking member at said first position and allowing said locking member, when said pressure difference has exceeded a predetermined value, to move to said second position to engage with said engagable member.

2. A brake booster comprising:
(a) an input member for inputting a braking operational force;
(b) an output member for outputting a boosted braking force;
(c) a power piston dividing an interior area of a casing into two chambers, a constant pressure chamber and a variable pressure chamber, said power piston being normally urged by a resilient means toward a retracted position, and being advanced in the axial direction thereof against the force of said resilient means in accordance with the pressure difference in said two chambers;
(d) a control piston disposed relatively movably over a predetermined distance in the axial direction to said power piston, said control piston being normally retained at a retracted position by resilient means, and being forwardly movable together with said power piston when said power piston moves and reduces said predetermined distance to zero;

(e) a control valve operable in response to relative movement between said control piston and said input member to control the pressure difference in said two chambers;

(f) a transmitting mechanism for transmitting forces applied by said control piston and said input member, while allowing relative movement within a limited distance between said control piston and said input member;

(g) a reaction lever, abutting at one end thereof to an output portion of said transmitting mechanism, abutting at the other end thereof to an output portion of said power piston, and abutting at the middle portion thereof to an input portion of said output member, for transmitting, while allowing for a relative movement between said transmitting mechanism and said power piston, output forces from said transmitting mechanism and said power piston to said output member;

(h) a locking member retained by one of said power piston and said control piston and movable in a radial direction for engaging with, when being at an extended position thereof, an engaging portion disposed on the other of said power piston and said control piston to block the relative movement of said power and said control pistons, said locking member being retractable out of engagement with said engaging portion to permit relative movement between said power and said control pistons;

(i) an operating force imparting means for imparting an operating force to said locking member for extending it to engage with said engaging portion by virtue of said pressure difference in said two chambers; and (j) resilient means, normally holding the locking member at a retracted position, and allowing said locking member to extend when the operational force for extending the locking member imparted by said operating force imparting means has exceeded a predetermined value.

3. A brake booster claimed in claim 2, wherein said locking member is a lock piston which is gas-tightly and slidably fitted in a cylinder portion disposed in said control piston and affected by the pressure at the front side thereof from said constant pressure chamber, and said operating force imparting means is an air passageway for supplying pressure in said variable pressure chamber to the back side of said cylinder portion.

4. A brake booster claimed in claim 3, wherein said lock piston is provided with an engaging projection concentrically formed at the front end thereof and said engaging portion is an engaging hole formed in said power piston having a size sufficient to receive said engaging projection.

5. A brake booster claimed in claim 3, wherein the end of said air passageway opposite to the one end thereof connected to said cylinder portion, is open in the vicinity of said control valve for enhancing the response of said lock piston to the operation of said control valve.

6. A brake booster claimed in claim 2, wherein said constant pressure chamber is connected to a negative pressure source and is kept at a substantially constant pressure equal to the pressure in said negative pressure source, and said variable pressure chamber is selectively communicated by said control valve with either said constant pressure chamber or the ambient atmosphere so that the pressure therein may be variable between the pressure of said negative pressure source and atmospheric pressure.

7. A brake booster claimed in claim 2, wherein said constant pressure chamber is open to the ambient atmosphere and is constantly maintained at a constant pressure and said variable pressure chamber is selectively communicated by said control valve with either said constant pressure chamber or a positive pressure source so that the pressure may be variable between the pressure of said positive pressure source and atmospheric pressure.

8. A brake booster of the stroke enlarging type comprising:

(a) an input member for inputting a braking operational force;

(b) an output member for outputting a boosted braking force;

(c) a power piston dividing an interior area of a casing into two chambers, a constant pressure chamber and a variable pressure chamber, said power piston being normally urged by a resilient means toward a retracted position, and being advanced in the axial direction thereof against the force of said resilient means in accordance with the pressure difference in said two chambers;

(d) a control piston disposed relatively movably, over a predetermined distance, to said power piston in the axial direction thereof;

(e) spring means disposed between said power piston and said control piston for transmitting a part of the output of said power piston to said control piston;

(f) a control valve operable in response to relative movement between said control piston and said input member to control the pressure difference in said two chambers;

(g) a transmitting mechanism for transmitting forces applied by said control piston and said input member, while allowing the relative movement within a limited distance between said control piston and said input member;

(h) a reaction lever, abutting at one end thereof to an output portion of the transmitting mechanism, abutting at the other end thereof to an output portion of the power piston, and abutting at the middle portion thereof to an input portion of said output member, for transmitting, while allowing for a relative movement between said transmitting mechanism and said power piston, output forces from said transmitting mechanism and said power piston to said output member;

(i) a locking member, retained by said control piston and movable in a radial direction of said control piston for blocking the relative movement between said control and power piston, when being in an extended position, by engagement with an engaging portion formed on said power piston, said locking member being retractable out of engagement with said engaging portion to permit relative movement between said power and said control pistons;

(j) operating force imparting means for imparting an operating force to said locking member for extending it to engage with said engaging portion by virtue of said pressure difference in said two chambers; and (k) resilient means, normally holding said locking member at a retracted position, and allowing said locking member to extend, when the operational force for extending the locking member imparted by said operating force imparting means has exceeded a predetermined value.

9. A brake booster claimed in claim 8, wherein said locking member is a lock piston which is gas-tightly and slidably fitted in a cylinder portion disposed in said power piston and said operating force imparting means is a passageway for leading the pressure in said constant pressure chamber and variable pressure chamber respectively to the front side and the rear side of said lock piston.

* * * * *